United States Patent
Berberich et al.

(10) Patent No.: US 6,317,035 B1
(45) Date of Patent: Nov. 13, 2001

(54) APPARATUS AND METHOD FOR ENABLING A SECURITY DEVICE, IN PARTICULAR AN ACCESS DEVICE FOR A MOTOR VEHICLE

(75) Inventors: Reinhold Berberich, Frankfurt; Christopher Sievers, Hanau; Thorsten Bürger, Schwalbach; Gregor Hassler, Bad Camberg, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/536,204

(22) Filed: Mar. 27, 2000

(30) Foreign Application Priority Data

Mar. 29, 1999 (DE) .............................................. 199 14 306
Aug. 31, 1999 (DE) .............................................. 199 41 350

(51) Int. Cl.⁷ .................................................. B60R 25/10
(52) U.S. Cl. ............... 340/426; 340/825.31; 340/825.32; 340/10.2
(58) Field of Search ............................... 340/426, 825.31, 340/825.3, 825.34, 825.32, 825.54, 10.2, 505, 10.5, 825.69, 825.72; 307/10.1; 341/176

(56) References Cited

U.S. PATENT DOCUMENTS 5,844,517  12/1998  Lambropoulos ..................... 341/176
5,945,906  * 8/1999  Onuma ............................... 340/425.5

FOREIGN PATENT DOCUMENTS

| 4440680 | 6/1995 | (DE) . |
| 19736302 | 4/1998 | (DE) . |
| 19743101 | 5/1998 | (DE) . |
| 19652227 | 6/1998 | (DE) . |
| 19718764 | 8/1998 | (DE) . |
| 19734341 | 2/1999 | (DE) . |
| 19736692 | 2/1999 | (DE) . |
| 9218732 | 10/1992 | (WO) . |

* cited by examiner

Primary Examiner—Daryl Pope
(74) Attorney, Agent, or Firm—Martin A. Farber

(57) ABSTRACT

In an apparatus and a method for enabling and/or activating/deactivating a security device, in particular an access device for a motor vehicle, in which, after receiving a stimulation sequence which is transmitted by a transmitter of a transmission device, coded information (enable signal) is transmitted by a portable transmission unit (radio key) and is received by a receiver in the transmission device, a controller comparing the received enable signal with predetermined coded information and, if they match, emitting an actuation signal to the security device, if a plurality of matching radio keys are present in the reception area of the device, the transmission quality between the security device and the radio keys is checked. The only radio key which is used to transmit an enable signal is that which has the best transmission conditions to the security device.

18 Claims, 3 Drawing Sheets

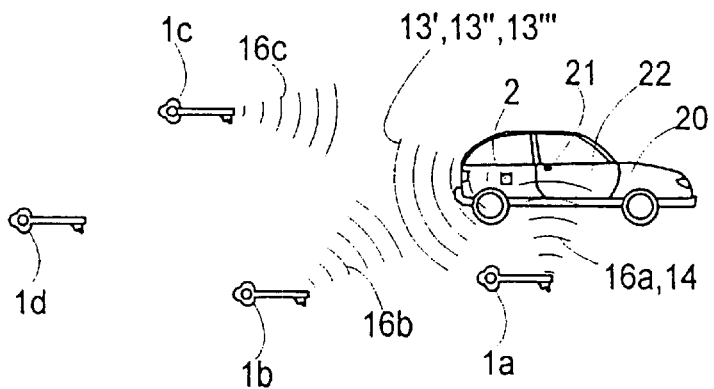
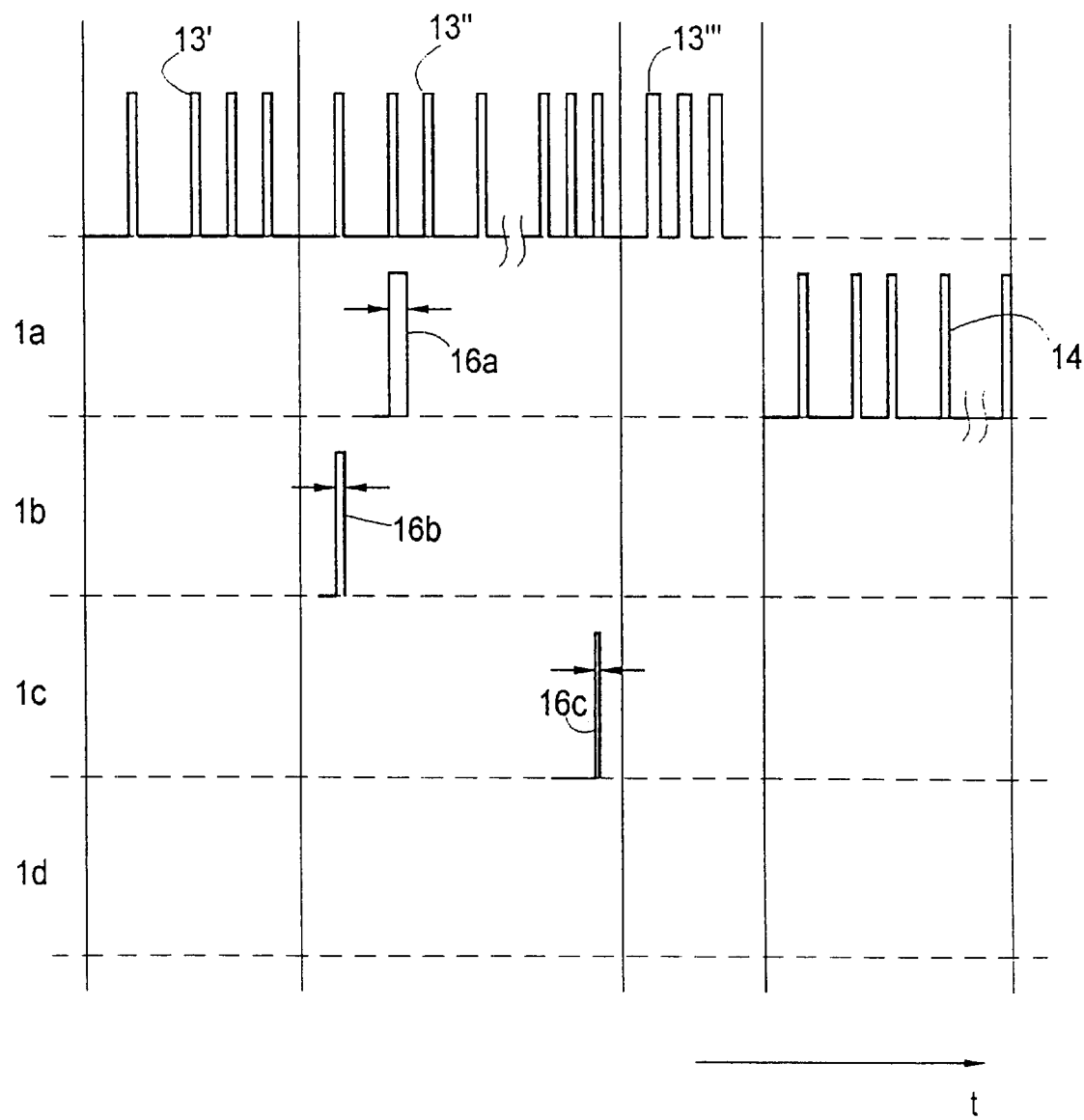
Fig. 2
Fig. 3

APPARATUS AND METHOD FOR ENABLING A SECURITY DEVICE, IN PARTICULAR AN ACCESS DEVICE FOR A MOTOR VEHICLE

FIELD AND BACKGROUND OF THE INVENTION

The invention relates to an apparatus for enabling and/or activating/deactivating a security device, in particular an access device for a motor vehicle, in which, after receiving a stimulation sequence which is transmitted by a transmitter of a transmission device, coded information (enable signal) is transmitted by a portable transmission unit (radio key) and is received by a receiver in the transmission device, with a controller comparing the received enable signal with predetermined coded information and, if they match, emitting an actuation signal to the security device.

In order to improve the convenience of use of access security devices, for example the central locking system of motor vehicles, electronic radio keys have recently come into use, which transmit an electromagnetic enable signal to the security device on pressing a button or completely automatically, and the said device then enables access. In these devices, the radio keys replace the conventional mechanical keys.

An apparatus for operating a door locking and/or alarm system is known from WO 92/18732. In this system, the user carries a radio key in which an enable code is stored in order to activate and deactivate the said security devices. The motor vehicle contains a transmission apparatus, which receives an enable signal transmitted by the radio key, and compares it with a stored coding. If the codes match, an actuation signal is transmitted to the security device (central locking system, alarm system).

The enable signal is transmitted only when the person carrying the radio key is at a predetermined distance from the motor vehicle, which is within the range of the transmitter in the transmission apparatus. The radio key is activated by a stimulation sequence from the security device, without any manual action by the user.

Such a system is generally supplied with a number of matching radio keys. Normally, these keys may be distributed between a number of vehicle users. It is thus possible, once the stimulation sequence has been transmitted, for the security device to receive a response signal from a number of radio keys within range of the security device. This can lead to a collision resulting from all the keys transmitting signals without any coordination, so that the controller of the security device is unable to correctly identify an enable signal and to decide which of the signals is intended to be used as an enable signal.

Systems are known which, if there is any such suspicion, address all the radio keys in a system globally and, if the response is not clear, address individual radio keys selectively, one after the other. This has the disadvantage that, as the number of radio keys which a security device may have and which are located within range of the security device increases, the time required for the data interchange increases, so that the vehicle user is not allowed access to the vehicle until a noticeable time period has passed.

Since, as a rule, the radio key signals are quite weak and are transmitted poorly over a lengthy distance, interference can occur if the transmission path is poor. If interference occurs, the security device must once again select a radio key, and request it to transmit an enable signal. This once again results in a noticeable delay.

SUMMARY OF THE INVENTION

The object of the present invention is to specify an apparatus of the type mentioned initially, in which one radio key from a set of existing radio keys may be used to transmit the enable signal without any significant time delay. Furthermore, a method for its operation is to be specified.

According to the invention, the object is achieved in that the stimulation sequence (challenge signal) comprises a first message part with an identity of the security device, and a second message part, in which case the first message part excites those radio keys which are located in a predetermined area of a transmitter of the transmission device and match the security device to each emit a response signal with a mutual offset at different times during the transmission of the second message part, and in that the controller uses the response signals to select a suitable radio key from the set and to emit a selection signal which causes the selected radio key to emit the enable signal.

One advantage of the invention is that the presence of the radio keys within range of the security device is acknowledged even while the stimulation sequence is being transmitted. The controller can thus use the response signals to select a suitable one of the radio keys without any time delay, and can transmit the selection signal for the desired radio key, as part of the stimulation sequence, immediately following the rest of the stimulation sequence. No time delays occur as a result of the evaluation of the response signals from the various radio keys. The time required for the data interchange does not, in particular, exceed the time period required for transmission of the stimulation sequence.

A first refinement of the invention provides for the capability to transmit the response signals from the radio keys in synchronism with the second message part, in order to allow the controller to distinguish the response signals.

The response signals may be distinguished more easily if the response signals from each radio key are synchronized to in each case one other flank of the second message part.

The reception area of the transmission device is generally limited to a few meters or tenths of a meter. The signal transmission times between the radio keys and the transmission device are thus negligible. The transmission of the respective flanks of the second message part occurs approximately at the same time as the reception of the response signals, and the controller can determine which radio key has responded.

As an alternative to this, it is possible for the individual radio keys to transmit their response signals at different time intervals after receiving the first message part of the stimulation sequence.

The controller can thus use the fixed-defined times for the acknowledgement to determine which radio keys are within range. Once the controller has selected one of the radio keys, it expressly requests this key to return the enable signal, in the knowledge of which radio keys are present.

In order to allow signals to be transmitted and received in parallel, it has been found to be advantageous for the stimulation sequence to be transmitted in a frequency band that is different to that of the response signals.

It is also advantageous for the stimulation sequence and the selection signal to be transmitted as longwave signals, and for the response signals and the enable signal to be transmitted as shortwave signals. In this way, the signals do not interfere with one another, and the portable radio keys may be designed to be very compact, since they do not require a longwave transmitter.

In order to define the second message part, a next refinement of the invention provides for the transmission device to have a first computation unit, and for each radio key to have one second computation unit, for algorithms to define the second message part to be stored in the computation units, and for the second message part to be redefined independently, using the algorithms in the computation units, after each transmission has been made. This improves the security of the apparatus according to the invention against unauthorized operation.

Further advantageous functions can be achieved if each response signal contains further information that is characteristic of the respective radio key. For example, if the invention is used in hotels, this allows only the hotel personnel radio keys to be enabled when the room occupier is not present. It is also possible to inhibit individual matching radio keys. For example, radio keys which have been lost can thus easily be made unusable, and this is an advantage over the use of mechanical keys.

In a method for enabling and/or activating/deactivating a security device, in particular an apparatus according to the invention, in which, after receiving a stimulation sequence transmitted by a transmitter in a transmission device, an enable signal is transmitted by a portable transmission unit (radio key) and is received by a receiver in the transmission device, a controller comparing the received enable signal, with predetermined coded information and, if they match, emitting an actuation signal to the security device, the invention provides that if a plurality of matching radio keys are present, the transmission quality between the transmission device and the radio keys is checked, and that the only one of the radio keys which is used to transmit an enable signal is that which has the best transmission path for transmission of the enable signal. As a rule, this will be that radio key whose signals have the least amount of transmission noise, or the least amount of interference from other effects, and which thus leads to the expectation that the enable signal will be transmitted most quickly and with least interference.

It is also possible to provide for that radio key to be selected whose transmission path has the least attenuation/lowest-noise transmission of the transmitted signals. This is normally that one of the radio keys which is located closest to the transmission device.

If only a single radio key is present in the detection area, it is possible to check whether the transmission quality is adequate. If this is not the case, access may be refused, or the key may be addressed once again.

A further refinement of the invention provides that each of the radio keys determines the field strength of the stimulation sequence received by it, and that the only one of the radio keys which is requested to transmit an enable signal is that which has detected the highest received field strength. To this end, it is also possible to provide that each of the radio keys returns the detected value of the field strength as the response signal, and that the controller uses the received values to selected the suitable radio key and to transmit the selection signal.

A next refinement of the invention provides that the volume of the received field strength is coded as the width of the response signals.

In another refinement, the invention provides that the intensity of the response signals is used to deduce the quality of the return transmission path between the radio keys and the transmission device, and that a radio key whose response signal is too weak is not used to transmit the enable signal.

In a next refinement, the invention provides that each of the radio keys returns (reflects) the received stimulus sequence at least partially unchanged once again, and that the controller uses the signal characteristics (received field strength) of the pulses which have been returned once again to select the most suitable radio key, and to transmit the selection signal. Transmitting the signals backward and forward doubles the distance traveled, and there is thus a correspondingly greater influence on the transmitted signals than with a single transmission path. Both the outward path and the return path may thus be included in the assessment. Furthermore, complex measurement electronics for measuring the signal field strength may be accommodated in the controller itself. The radio keys may have a small and simple design.

Furthermore, the method according to the invention can be implemented in that the transmission quality between the transmission unit and the radio keys is determined by measuring the duration of that part of a transmitted signal which exceeds a predetermined reception threshold. The rising and falling form of the signal transmitted without wires via antennas allows the duration of the received part of the signal that is below the threshold to be directly related to the signal attenuation.

To do this, it is possible to provide for each radio key to reflect parts of the stimulation sequence at a predetermined time, in that it returns that signal element of the amplitude profile of the stimulation sequence which is above its reception threshold as a pulse of length (t) to the transmission device, in which case the length of the returned pulse is measured by the transmission device, and is used as a decision criterion for the selection of a specific radio key.

BRIEF DESCRIPTION OF THE DRAWINGS

Exemplary embodiments of the invention are explained in more detail in the following description and are illustrated in a number of figures in the drawings, in which:

FIG. 2 shows a motor vehicle communicating with a number of radio keys, FIG. 3 shows a graph of signals transmitted when carrying out a method according to the invention.

DETAILED DESCRIPTION OF THE PREFERRED EMBODIMENT

Identical parts are provided with the same reference symbols in the figures.

Figure 1:
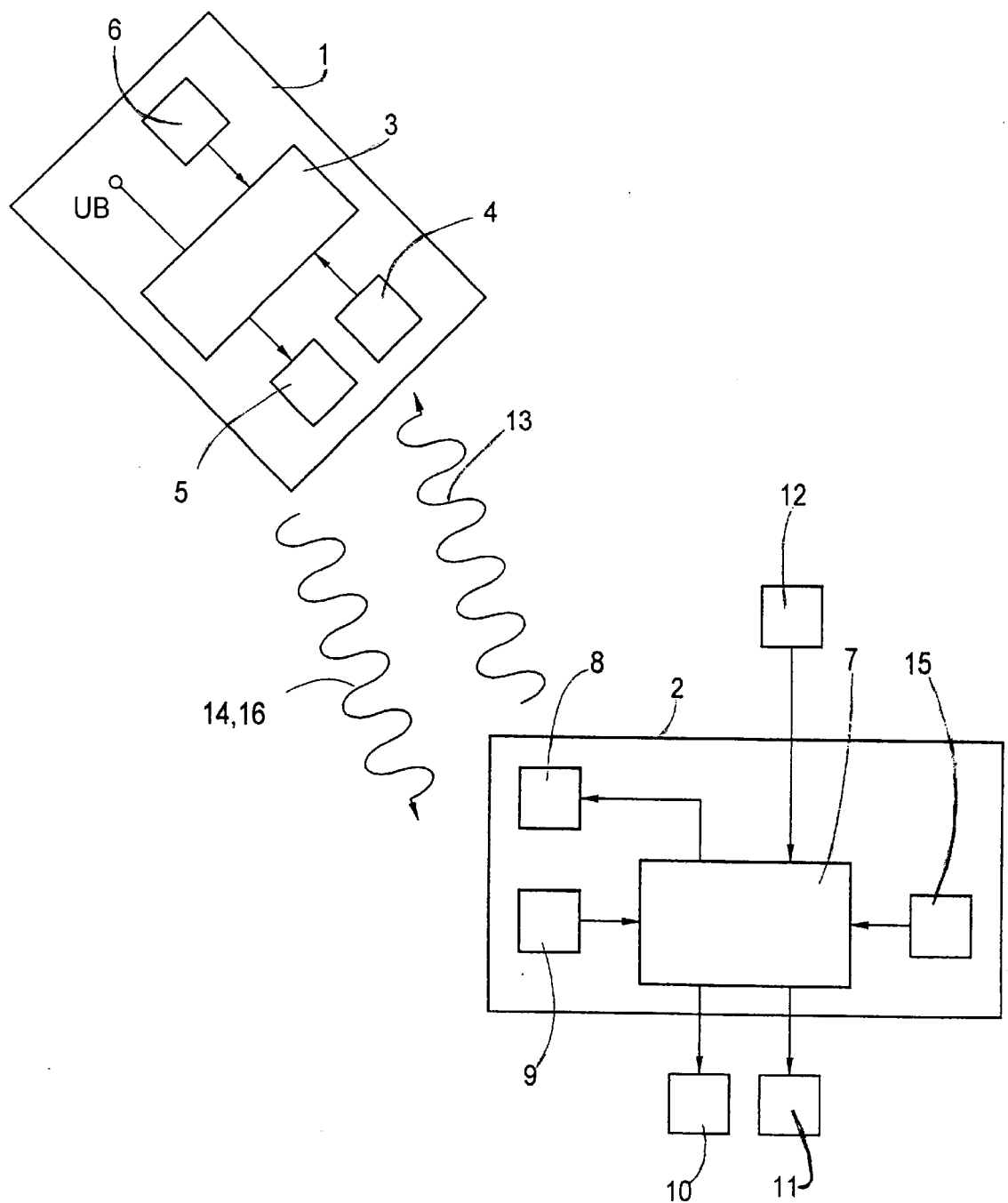
FIG. 1 shows a block diagram of a security device according to the invention, together with one radio key.

In the vehicle access and driving authorization system shown in FIG. 1, non-contacting interrogation of an identification transmitter (radio key) in the form of a transmitter 1 allows the process of opening and starting a vehicle to be considerably more convenient. The transmitter 1 may be carried as desired on the body (for example in a jacket or trouser pocket), and need not be operated explicitly.

The apparatus has a transmission device in the form of a security appliance 2, which is permanently installed in a motor vehicle 20, as shown in FIG. 2. The radio key 1 contains a computation unit 3, which has a longwave receiver 4 and a shortwave transmitter 5. A random number generator 6 generates numbers from which a coding is produced using an algorithm stored in the computation unit 3.

The security appliance 2 likewise contains a computation unit 7, which is connected to a longwave transmitter 8 and a shortwave receiver 9. Furthermore, the computation unit 7 represents a controller, which is connected to a central locking system 10 and to a motor vehicle immobilizer 11, in order to actuate them. A sensor 12 arranged on a door handle of the motor vehicle supplies a signal to the computation unit 7 as soon as the door handle 21 is operated. This computation unit 7 also receives a random number from a random number generator 15, which random number is processed using an algorithm which operates identically to the algorithm stored in the computation unit 3.

Signals are interchanged, without any contact being made, between the radio key 1 and the security appliance 2. When the computation unit 7 in the security appliance 2 receives a signal from the sensor 12, the computation unit 7 produces a stimulation sequence 13, which is transmitted via the longwave transmitter 8 (challenge). This stimulation sequence 13 is received by the longwave receiver 4 in the radio key 1, and the computation unit 3 in the radio key 1 then causes an enable signal 14 to be transmitted (response).

The shortwave receiver 9 in the security appliance 2 receives the signal 14 and passes it on to the computation unit 7, which compares the enable signal 14 with a code stored in it or produced by the algorithm. If the information matches, the computation unit 7 emits an actuation signal either to the vehicle central locking system 10, to open or close the vehicle doors 22, and/or to an immobilizer 11 in order to activate or deactivate the propulsion system for the motor vehicle 20.

FIG. 2 shows the motor vehicle 20, which is provided with the security appliance 2. The motor vehicle 20 is surrounded by a number of radio keys 1*a* to 1*d*, which are symbolized by mechanical keys in the figure. Such radio keys may, for example, actually also have a conventional mechanical key part in order to operate the ignition lock, or else may be constructed entirely without any mechanical components.

When a door handle 7 of the motor vehicle 1 is operated, communication is initiated between the security appliance 2 and the radio keys 1*a* to 1*d* and, when a matching radio key 1*a* is found, the motor vehicle 20 is unlocked even before the door handle has been completely operated. This process takes place in a very short time, so that the door can be opened, by operating the door handle, just as if it had not been locked. There is no need to open the door locks using a mechanical key. Other security mechanisms, such as the ignition lock of the motor vehicle 20 or door locks on a building, can also be operated in the same way. Access to locked doors is facilitated merely by the presence of a matching radio key.

FIG. 3 shows the formation of the stimulation sequence 13. After the signal from the pressure sensor 12 occurs, the computation unit 7 produces a data string (challenge signal) which is composed of three parts: a fixed code (first message part) 13' (8 bits) corresponding to the vehicle identity, a second message part 13" (24 bits), and a selection signal 13'''. After receiving the vehicle identity 13', the individual radio keys 1*a* to 1*c* which are located within range of the longwave transmitter 8 and have thus been addressed each transmit a response signal 16*a* to 16*c* to the computation unit 7 in the time interval during which the second message part 13" is being transmitted from the security appliance 2 to the radio key 1.

In the above example, the response signals 16*a* to 16*c* from the individual radio keys are flank-synchronized to the second message part 13". The response signal 16*b* from the radio key 1*b* is thus produced at the same time as the first pulse of the second message part 13" is transmitted. The response signal 16*a* from the radio key 1*a* is transmitted at the same time as the second pulse of the second message part 13" from the radio key 1*a*. The radio key 1*d*, which is not within range of the longwave transmitter 4, cannot receive the vehicle identity, and thus does not supply any response signal either. The radio key 1*c*, which is once again in the transmitter area, supplies a response signal 16*c*, which occurs at the same time as the end flank of the second message part 13" transmitted by the computation unit 7 to the radio keys 1*a* to 1*d*.

The computation unit 7 evaluates the response signals 16*a* to 16*c* received from the individual radio keys 1*a* to 1*c*, and uses the intensity of the signals to determine that, in the present case, the radio key 1*a* is the most suitable for signal transmission and should emit the enable signal 14. To this end, a selection signal 13''', which responds to the second radio key 1*a*, is attached to the second message part 13'''. This radio key 1*a* transmits the enable signal 14 once it has received the selection signal 13'''. This enable signal 14 is compared with coded information produced in the security appliance 2, with the central locking system 10 and/or the immobilizer 11 being actuated if they match. The entire process lasts only fractions of a second, and thus allows the door to be unlocked automatically even before the door handle 7 has been completely operated, so that the user has the impression that the door was not locked.

The security appliance 2 transmits in the longwave band at frequencies around 125 kHz, and receives in the shortwave band at frequencies of 315 MHz, 433 MHz or 486 MHz. The radio keys 1*a* to 1*d* receive on longwave, and transmit using shortwave.

The described method allows the desired radio key to be addressed without any additional time penalty, irrespective of the number of radio keys present in the interrogation area. There is no need whatsoever for multiple interrogations.

Figure 4:
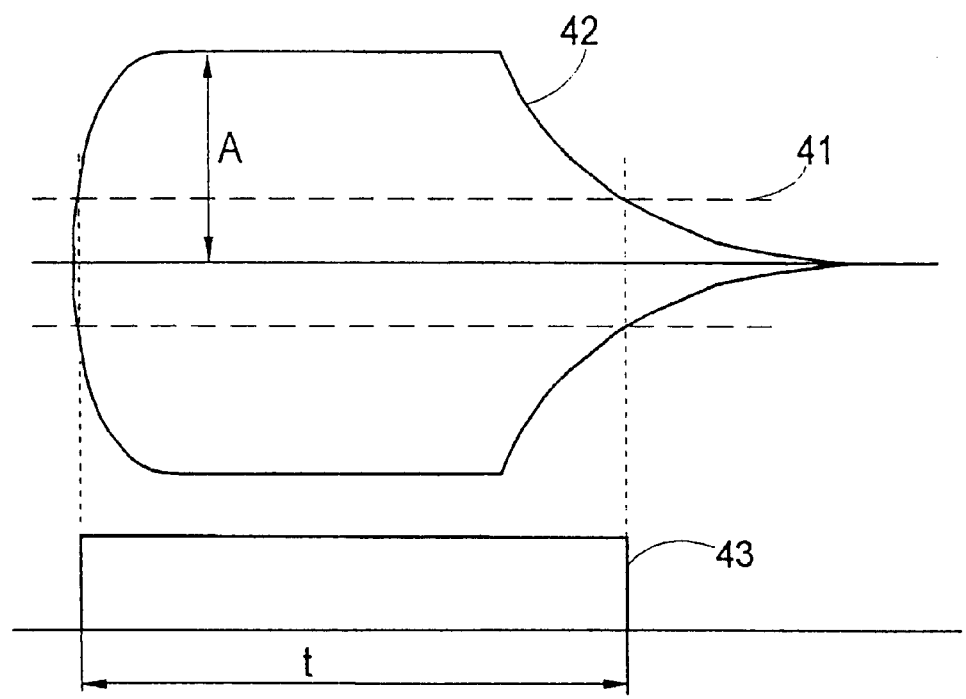
FIG. 4 shows a sketch of the field strength measurement in a radio key.

The exemplary embodiment shown in FIG. 3 shows the respective received field strength transmitted from the radio key 1 to the security appliance 2 by pulse-width modulation. The production of the modulated pulses will be explained in the following text with reference to FIG. 4. The receiver 4 (FIG. 1) in a radio key 1 receives a signal 42, which is above a defined amplitude threshold 41 and is illustrated in FIG. 4, for simplicity, as the envelope curve of its train of oscillations, and the transmitted stimulation sequence 13' is attenuated as a function of the distance from the security appliance 2. The radio key now measures the duration t of that part of the received, attenuated signal 42 which exceeds the amplitude threshold 41 which duration correlates with the signal attenuation, and thus directly with the distance to the transmitter 8, and returns the measured value in pulse-width-coded form in the response signal 16. The security appliance 2 evaluates the modulation of the response signals 16*a* to 16*c* from the radio keys 1*a* to 1*c*, and thus determines the radio key with the best reception.

The signal 42 is converted in the receiver 4 via an amplitude threshold 41 into a square-wave signal 43 of length t. If the radio key 1 is at a long distance from the security appliance 2, then the received field strength is reduced, and the maximum amplitude A of the signal 42 arriving at the radio key 1 is thus reduced. After conversion via the amplitude threshold, a square-wave signal 43 is produced, whose length t reflects the received field strength. After transmission of a pulse, modulated on the basis of the square-wave signal, to the security appliance 2, the reception quality at the radio key 1 can be determined from the width of the pulse.

We claim:

1. An apparatus for enabling and/or activating/deactivating a security device, in particular an access device for a motor vehicle, in which, after receiving a stimulation sequence which is transmitted by a transmitter of a transmission device, coded information (enable signal) is transmitted by a portable transmission unit (radio key) and is received by a receiver in the transmission device, a controller comparing the received enable signal with predetermined coded information and, if they match, emitting an actuation signal to the security device, wherein the stimulation sequence (challenge signal) (13) comprises a first message part (13') with an identity of the security device, and a second message part (13"), in which case the first message part (13') excites those radio keys (1, 1a to 1d) which are located in a predetermined area of the transmitter (9) of the transmission device (2) and match the security device to each emit a response signal (16a, 16b, 16c) with a mutual offset at different times during the transmission of the second message part (13"), and wherein the controller (7) uses the response signals (16a, 16b, 16c) to select a suitable radio key (1a) from the set (1, 1a to 1d) and to emit a selection signal (13''') which causes the selected radio key (1a) to emit the enable signal (14).

2. The apparatus as claimed in claim 1, wherein said response signals (16a, 16b, 16c) from the radio keys (1, 1a to 1d) can be emitted in synchronism with the second message part (13") in order that the controller (7) can distinguish the response signals (16a, 16b, 16c).

3. The apparatus as claimed in claim 1, wherein the response signals (16a, 16b, 16c) from each radio key (1, 1a to 1d) are synchronized with in each case one other flank of the second message part (13").

4. The apparatus as claimed in claim 1, wherein the individual radio keys (1, 1a to 1d) emit their response signals (16a, 16b, 16c) at different time intervals after receiving the first message part (13') of said stimulation sequence (13).

5. The apparatus as claimed in claim 1, wherein the stimulation sequence (13) is emitted in a different frequency band to that of the response signals (16a, 16b, 16c).

6. The apparatus as claimed in claim 5, wherein said stimulation sequence (13) and the selection signal (13''') are transmitted as longwave signals, and the response signal (16a, 16b, 16c) and the enable signal (14) are transmitted as shortwave signals.

7. The apparatus as claimed in claim 6, wherein the transmission device (2) has a first computation unit (7), and each said radio key (1, 1a to 1d) has one second computation unit (3), wherein algorithms to define the second message part (13") are stored in the computation unit (7, 3), and wherein the second message part (13") is redefined independently, using the algorithms in the computation units (7, 3) after each transmission has been made.

8. The apparatus as claimed in claim 5, wherein each said response signal (16a, 16b, 16c) contains further information that is characteristic of the respective radio key.

9. A method for enabling and/or activating/deactivating a security device, in particular an apparatus as claimed in claim 1, in which, after receiving a stimulation sequence transmitted by a transmitter in a transmission device, an enable signal is transmitted by a portable transmission unit (radio key) and is received by a receiver in the transmission device, a controller comparing the received enable signal with predetermined coded information and, if they match, emitting an actuation signal to the security device, further comprising the steps wherein, if a plurality of matching radio keys (1a to 1d) are present, checking the transmission quality between the transmission device (2) and the radio keys (1a to 1d), and wherein the only one (1a) of the radio keys (1a to 1d) which is used to transmit an enable signal (14) is that which has the best transmission path for transmission of the enable signal (14).

10. The method as claimed in claim 9, wherein that one (1a) of the radio keys (1a to 1d) is selected whose transmission path has least attenuation/least-noise transmission of the transmitted signals.

11. The method as claimed in claim 9, wherein each of the radio keys (1a to 1d) determines the field strength of the stimulation sequence (13) received by it, and wherein the only one (1a) of the radio keys which is requested to transmit an enable signal (14) is that which has detected the highest received field strength.

12. The method as claimed in claim 11, wherein each of the radio keys (1a to 1d) returns the detected value of the received field strength as the response signal (16a to 16c), and wherein the controller (7) uses the received values to select the suitable radio key (1a) and to transmit the selection signal.

13. The method as claimed in claim 12, wherein value of the received field strength is coded as the width of the response signals (16a to 16c).

14. The method as claimed in claim 12, wherein the intensity of the response signals is used to deduce the quality of the return transmission path between the radio keys and the transmission device, and wherein a radio key whose response signal is too weak is not used to transmit the enable signal (14).

15. The method as claimed in claim 9, wherein each of the radio keys returns (reflects) the received stimulus sequence at least partially unchanged once again, and wherein the controller uses the signal characteristics (received field strength) of the pulses which have been returned once again to select the most suitable radio key, and to transmit the selection signal.

16. A method for enabling and/or activating/deactivating a security device, in particular an apparatus as claimed in claim 1, in which, after receiving a stimulation sequence transmitted by a transmitter in a transmission device, an enable signal is transmitted by a portable transmission unit (radio key) and is received by a receiver in the transmission device, a controller comparing the received enable signal with predetermined coded information and, if they match, emitting an actuation signal to the security device, further comprising the step of determining the transmission quality between the transmission unit and the radio keys by measuring the duration (t) of that part of a transmitted signal (42) which exceeds a predetermined reception threshold (41).

17. A method for enabling and/or activating/deactivating a security device, in particular an apparatus as claimed in claim 1, in which, after receiving a stimulation sequence transmitted by a transmitter in a transmission device, an enable signal is transmitted by a portable transmission unit (radio key) and is received by a receiver in the transmission device, with a controller comparing the received enable signal with predetermined coded information and, if they match, emitting an actuation signal to the security device, comprising the steps wherein each radio key (1) reflects parts of the stimulation sequence (13) at a predetermined time, in that it returns the signal element of the amplitude profile (42) of the stimulation sequence (13) which is above its reception threshold (41) as a pulse (43) of length (t) to the transmission device (2), in which case the length (t) of the returned pulse is measured by the transmission device (2), and is used as a decision criterion for the selection of a specific radio key (1).

18. A system for enabling a security device in a vehicle, comprising:

the security device and a controller located in the vehicle;

a sensor of movement of a door handle of the vehicle;

at least one electronic key having a transceiver and code processing means to be carried by at least one person intending to use the vehicle;

wherein the controller, in response to a handle motion signal from the sensor, emits an interrogation signal to the transceiver;

the code processing means, in response to reception of the interrogation signal by the transducer, compares a code of the interrogation signal with a reference to validate the at least one key, and upon determination of validity of the at least one key for operating the vehicle, the code processing means activates the transceiver to transmit an actuation signal to the controller in the vehicle; and the controller, in response to the actuation signal from the at least one key, enables the security device to permit entry into and operation of the vehicle.

* * * * *